(12) United States Patent
Kubota

(10) Patent No.: US 6,809,832 B2
(45) Date of Patent: *Oct. 26, 2004

(54) PRINT CONTROL APPARATUS WITH DECOMPRESSION, AND METHOD AND STORAGE MEDIUM

(75) Inventor: Tsutomu Kubota, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/917,942

(22) Filed: Aug. 27, 1997

(65) Prior Publication Data

US 2002/0089695 A1 Jul. 11, 2002

(30) Foreign Application Priority Data

Aug. 30, 1996 (JP) .............................................. 8-249324
May 9, 1997 (JP) .............................................. 9-136041

(51) Int. Cl.[7] .............................................. G06K 15/00
(52) U.S. Cl. ...................... 358/1.16; 382/232; 382/233; 358/426.05; 358/404

(58) Field of Search ................................. 358/468, 434, 358/462, 435, 436, 438, 439, 426, 444, 404, 1.1–1.9, 1.11–1.18, 426.05; 382/232, 233, 166

(56) References Cited

U.S. PATENT DOCUMENTS

| | | | | |
|---|---|---|---|---|
| 4,722,064 A | * | 1/1988 | Suzuki | 358/1.15 |
| 5,047,955 A | * | 9/1991 | Shope et al. | 364/519 |
| 5,113,494 A | * | 5/1992 | Menendez et al. | 364/231.8 |
| 5,337,258 A | * | 8/1994 | Dennis | 364/551.1 |
| 5,490,237 A | * | 2/1996 | Zimmerman et al. | 395/115 |
| 5,633,878 A | * | 5/1997 | Ernkell et al. | 395/183.18 |
| 5,720,014 A | * | 2/1998 | Ikeda et al. | 358/442 |
| 5,740,028 A | * | 4/1998 | Sugiyama et al. | 364/130 |
| 5,835,788 A | * | 11/1998 | Blumer | 395/853 |
| 5,864,652 A | * | 1/1999 | Murahashi | 358/1.16 |
| 6,215,558 B1 | | 4/2001 | Kubota | 358/1.15 |

* cited by examiner

Primary Examiner—King Y. Poon
(74) Attorney, Agent, or Firm—Fitzpatrick, Cella, Harper & Scinto (57) ABSTRACT

A print control apparatus which can print and output bit map image data while executing a decompressing process. The print data is directly outputted to a recorder and printed without being written into a frame buffer, or is stored into the frame buffer and outputted and printed, in accordance with the kind of print data.

12 Claims, 10 Drawing Sheets

PRINT CONTROL APPARATUS WITH DECOMPRESSION, AND METHOD AND STORAGE MEDIUM

BACKGROUND OF THE INVENTION

1. Field of the Invention

The invention relates to a print control apparatus for outputting image data.

2. Related Background Art

Hitherto, it has been the practice that compressed image data is decompressed and is temporarily stored into a memory, and the data in the memory is again read out and is outputted as video data to a recorder.

In the above-mentioned prior art, however, since decompressed bit map image data is stored into the memory, there is a drawback in that the use frequency of the data bus increases.

SUMMARY OF THE INVENTION

It is, therefore, an object of the invention to provide a print control apparatus which can print and output bit map image data while executing a decompressing process without storing the bit map image data which was byte run length compressed into a memory.

Another object of the invention is to provide a print control apparatus in which, in accordance with a kind of data included in print data, the data can be directly outputted to a recorder without storing into a frame buffer or the data can be stored into the frame buffer and then outputted.

For the purpose of accomplishing the above objects, according to the invention, FIFO register is provided as a data buffer between a memory and a decompressor circuit and a cycle time for input/output is set so that a cycle time for writing is equal to or faster than a cycle time for reading.

A capacity of the buffer is equal to or larger than the product of the worst value of data compression and an amount of parallel data which is given to a video output per once, so that the compressed data is decompressed by the decompressor circuit without interrupting video data to be printed and outputted, thereby forming bit map image data.

In the print control apparatus for receiving print data, outputting it to a recorder, and printing, when compression image data exists in one band, the data is not stored in the frame buffer but is directly outputted to the recorder and, when a plurality of sets of, image data or other data exists in one band, the data is stored into the frame buffer and is outputted.

BRIEF DESCRIPTION OF THE DRAWINGS

FIG. 9, consisting of FIG. 9A and FIG. 9B, is a flowchart showing the operation to output an image in the operations of the print controller in the embodiment 3 of the invention.

DETAILED DESCRIPTION OF THE PREFERRED EMBODIMENTS

[Embodiment 1]

Figure 1:
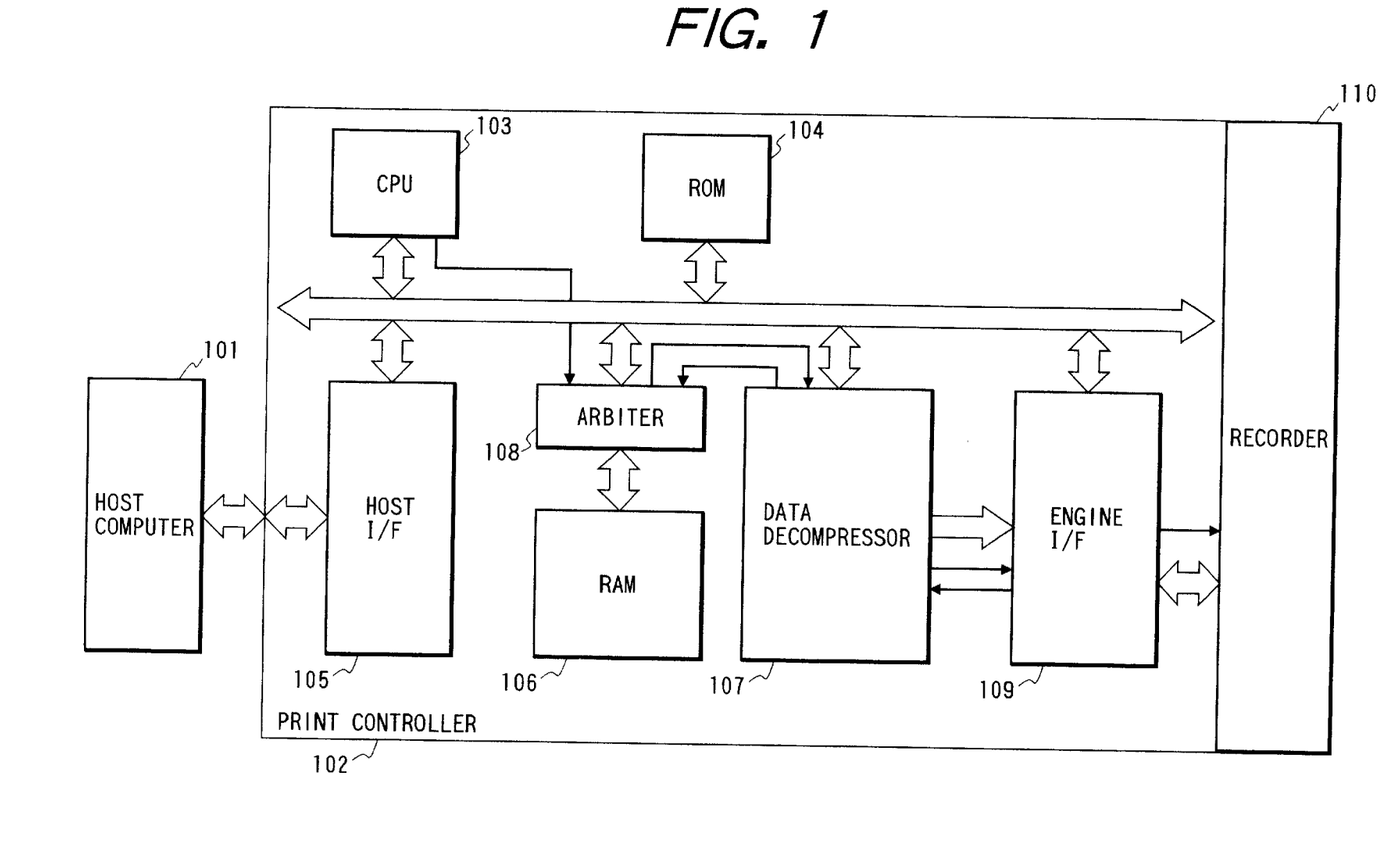
FIG. 1 is a block diagram showing a system construction in each embodiment of the invention.

FIG. 1 is a constructional diagram for explaining the operation of a print control apparatus in each embodiment of the invention. In FIG. 1, reference numeral 101 denotes a host computer; 102 a print controller; 103 a CPU for controlling the print controller 102; 104 a ROM in which a control program of the print controller 102 has been stored; 105 a host interface (I/F) for controlling communication with the host computer 101; 106 a RAM; 107 a data decompressor; 108 an arbiter for arbitrating accesses to the RAM 106; 109 an engine I/F; and 110 a recorder for actually printing on a paper.

Figure 2:
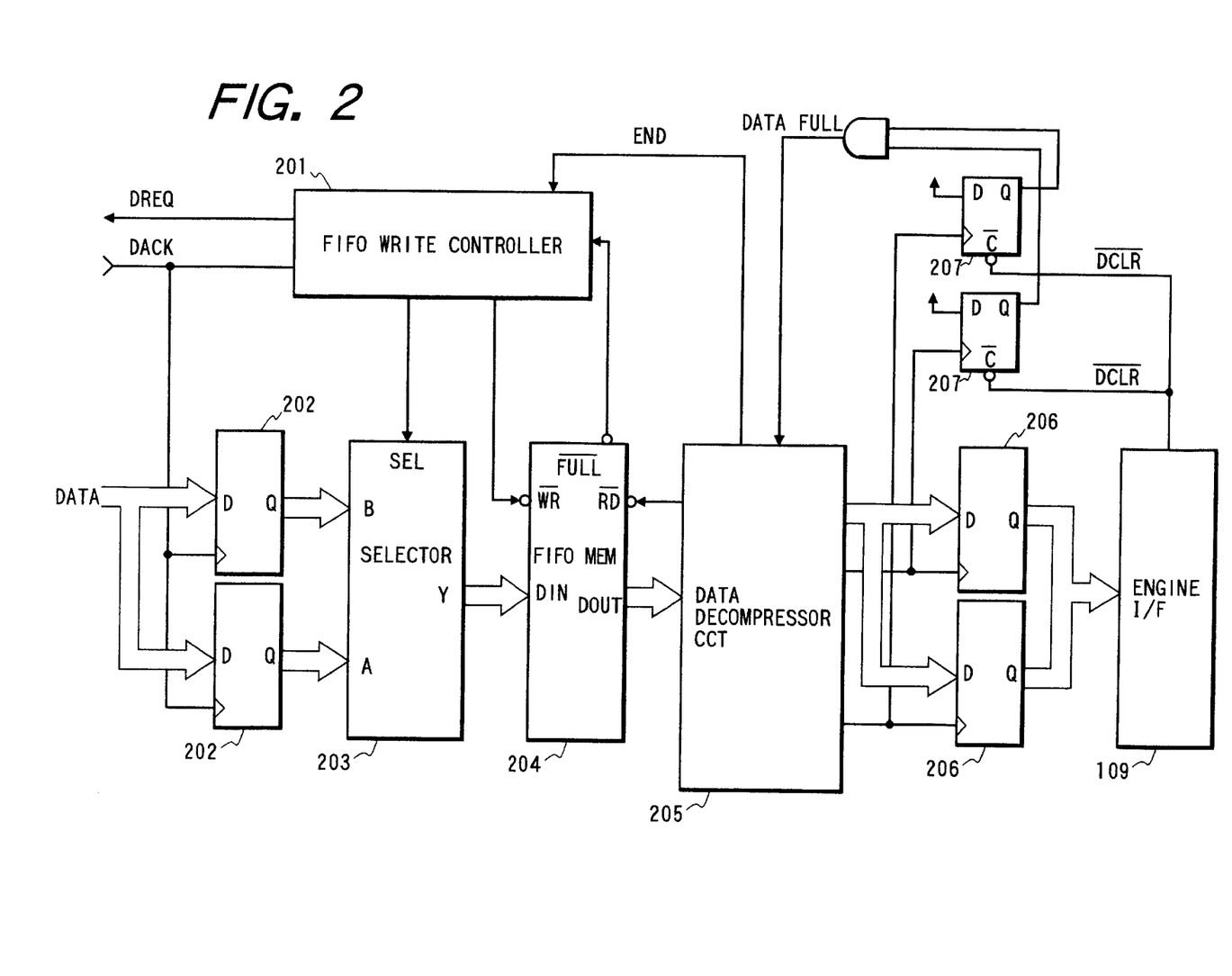
FIG. 2 is a block diagram showing a construction of a data decompressor in embodiment 1 of the invention.

FIG. 2 is an internal constructional diagram of the data decompressor 107 in the embodiment 1. In FIG. 2, reference numeral 201 denotes a FIFO write controller; 202 a flip-flop for holding data; 203 a data selector; 204 an FIFO memory; 205 a data decompressor circuit; 206 a flip-flop for holding the decompressed data; and 207 a flip-flop for a flag indicating that data was written into the flip-flop 206.

A data compressing method which is used in this embodiment will now be explained.

(1) Data having repetition:
  (a) Command (1 byte): Designates the number of times of successive appearance.
    A value to be designated is given by "[(the number of times of appearance)−1]×(−1)" and is set to a value within a range from FFh (2 times) to 81h (128 times).
  (b) Data (1 byte): Writes data which appears.
(2) Data having no repetition:
  (a) Command (1 byte): Designates the number of bytes of data having no repetition.
    A value to be designated is given by "(the number of bytes)−1" and is set to a value within a range from 00h (1 byte) to 7Fh (128 bytes).
  (b) Data portion (1 byte or more): Writes data having no repetition.

In FIG. 1, when compressed image data, for example, image data compressed by a pack-bits compressing form, is transmitted from the host computer 101, the CPU 103 transfers the data to the RAM 106 through the host I/F 105. The receiving operation is performed until the reception of the compression image data, up to one page, is completed. When the data of one page is stored, the CPU 103 activates the data decompressor 107 and engine I/F 109. The activated data decompressor 107 reads out the compression data held in the RAM 106 and decompresses the data. The engine I/F 109 reads the decompressed data, executes a parallel/serial conversion, and outputs video data to the recorder 110.

Figure 4:
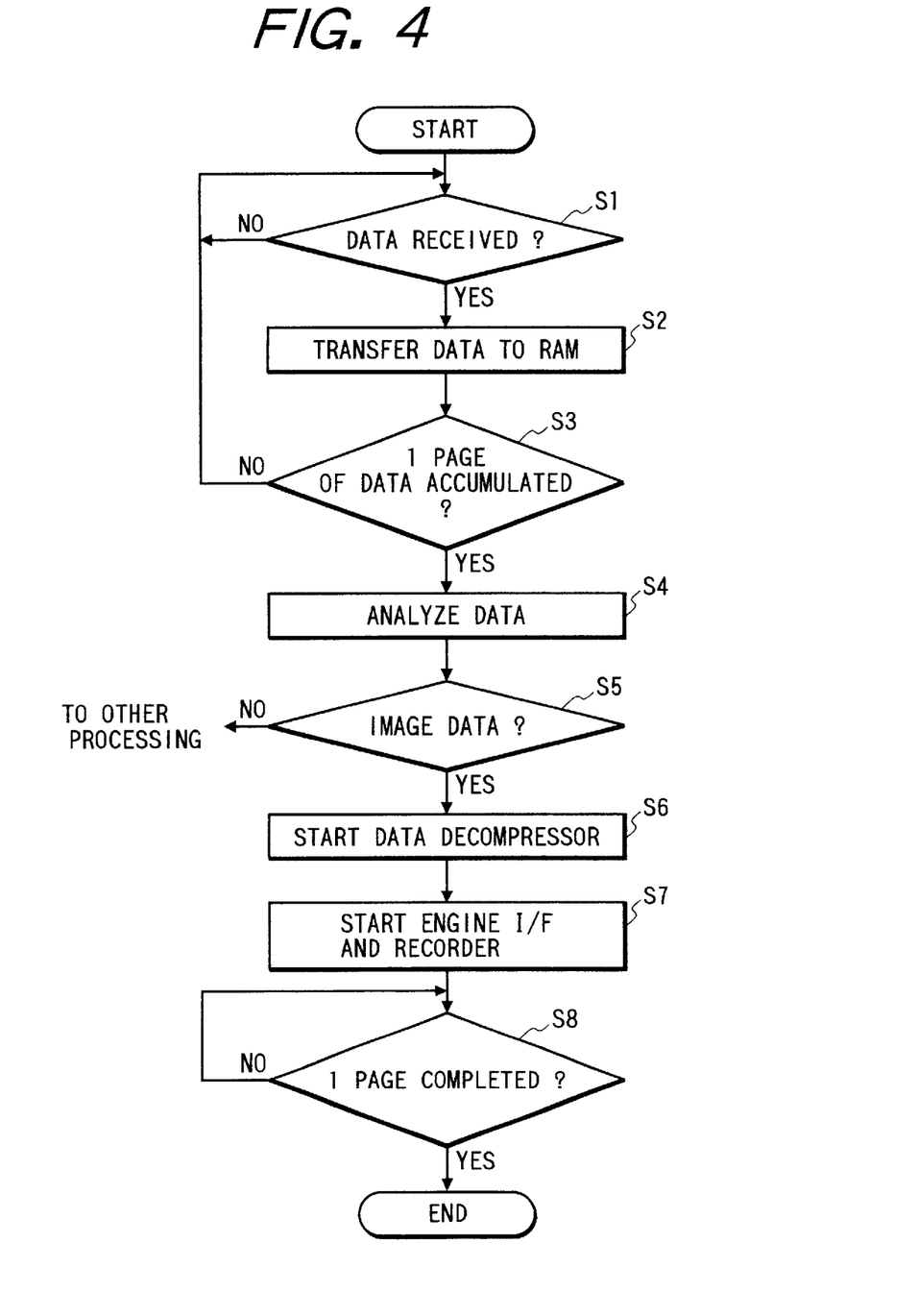
FIG. 4 is a flowchart showing the operation of a print controller in embodiments 1 and 2 of the invention.

The operation of the print control apparatus of each embodiment of the invention will now be described with reference to a flowchart of FIG. 4. The print controller 102 waits for reception of the data from, for example, the host computer 101 as an external apparatus (step S1) and transfers the data to the RAM 106 (step S2). Subsequently, a check is made to see if one page of data has been accumulated in the RAM 106 (step S3). If YES, the data in the RAM 106 is analyzed (step S4). A check is made to see if the data is image data (step S5). As a result of discrimination in step S5, when the data is not image data, other processing is performed. In case of the image data, the data decompressor 107 is started (step S6). Subsequently, the engine I/F 109 and recorder 110 are started (step S7) and the printing operation is performed. The apparatus waits for the completion of the printing of one page (step S8). The printing of one page is now finished.

As mentioned above, when the data decompressor 107 is started, in FIG. 2, the FIFO write controller 201 outputs a DMA address and a DREQ (DMA REQuest) signal to the arbiter 108 (refer to FIG. 1). When the data is read out from the RAM 106, the arbiter 108 outputs the data together with a DACK (Data ACKnowledge) signal to the data decompressor 107. The FIFO write controller 201 which receives the DACK signal sets the DREQ signal to be false and allows the flip-flop 202 to hold the data.

First, data of A is written into the FIFO memory 204 through the data selector 203. Subsequently, the data selector 203 is switched to B and the data is written into the FIFO memory 204. The FIFO write controller 201 executes DMA until a /FULL signal in the FIFO memory 204 is outputted (i.e., until the FIFO memory is full), writes the data into the FIFO memory 204, and executes such operation each time the /FULL signal becomes false. The operation is continued until the data decompressor circuit 205 finishes the operation and outputs an END signal.

The data decompressor circuit 205 reads out the compressed data from the FIFO memory 204, decompresses the data, writes the data into the D flip-flop 206, and also writes the data into the flip-flop 207 for flag. When the data of two bytes is set into the flip-flop 206, a DATAFULL signal is outputted and inputted to the data decompressor circuit 205. When the DATAFULL signal is inputted, the data decompressor circuit 205 stops the operation. When the engine I/F 109 reads the data set in the D flip-flop 206, a /DCLR signal is outputted and a signal (Q output) of the D flip-flop 207 for the flag is set to "L", so that the DATAFULL signal is set to be false. The data decompressor circuit 205 restarts the operation and sets the data to the D flip-flop 206. The above operation is continued until the printing of one page is completed.

By setting a cycle time for writing data into the FIFO memory 204 to be equal to or faster than a cycle time for reading data, as for a capacity of the FIFO memory 204, in the pack bits compression form shown in the embodiment, there is a case where an amount of data after compression increases as compared with an amount of data before compression. An increase rate (the worst value) is equal to 1.33 (compression data of four bytes is needed to form data of three bytes). From this value, it will be understood that now assuming that the D flip-flop 206 has a capacity of two bytes, so long as the FIFO memory 204 has a capacity of (2×1.33=3 bytes or more), and now assuming that the flip-flop 206 has a capacity of four bytes, so long as the FIFO memory 204 has a capacity of (4×1.33=6 bytes or more), the speed of preparation of the data decompressed by the data decompressor 205 can, on average, be made faster than the speed of getting the video data by the engine I/F 109. The data can be printed and outputted without interrupting the image.

[Embodiment 2]

Figure 3:
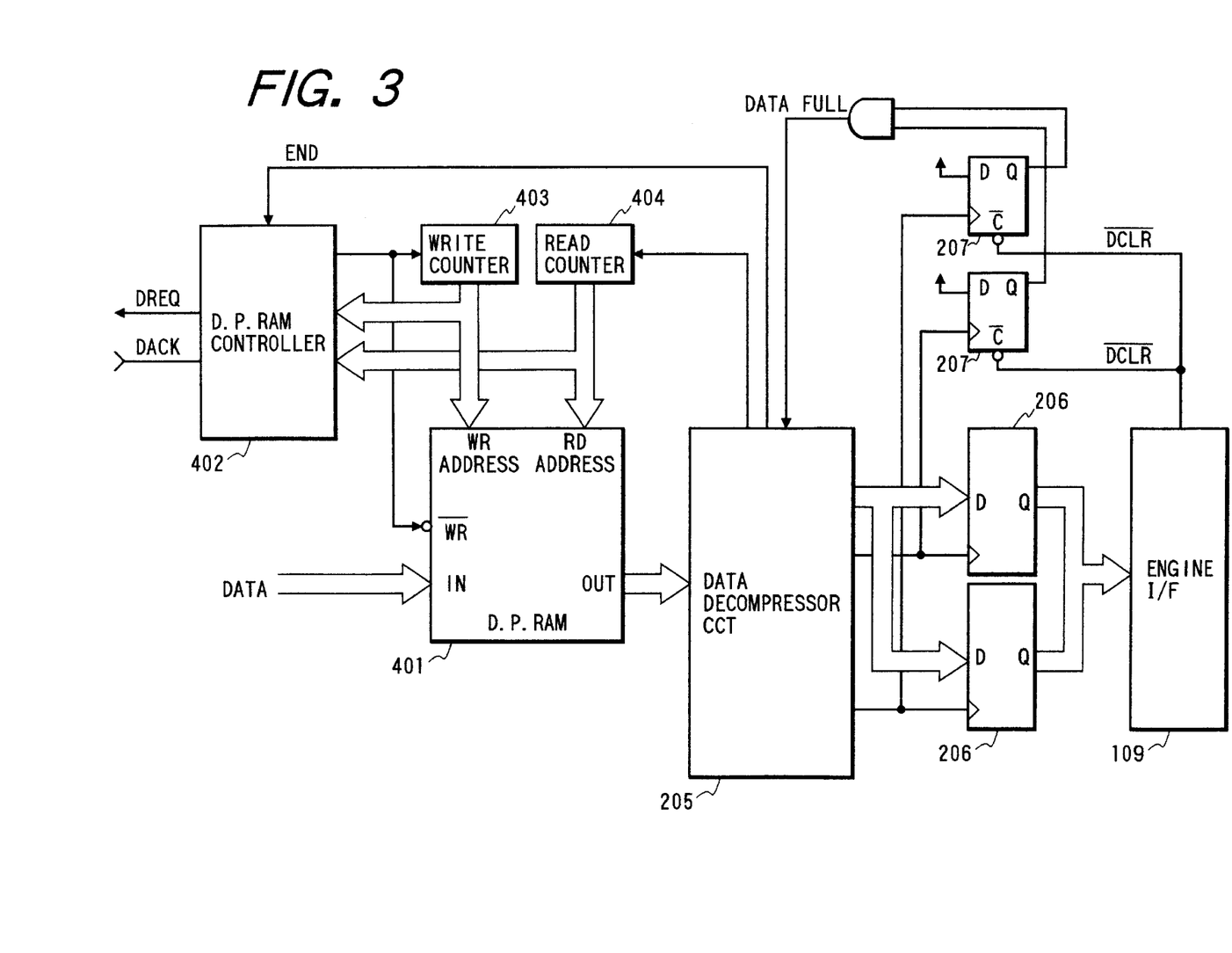
FIG. 3 is a block diagram showing a construction of a data decompressor in embodiment 2 of the invention.

FIG. 3 is a constructional diagram of the data decompressor of embodiment 2. In this diagram, reference numeral 401 denotes a Dual Port RAM (D. P. RAM); 402 a D. P. RAM controller; 403 a write counter; and 404 a read counter. The operation of the data decompressor 107 in this embodiment will now be explained. When the data decompressor 107 is started, the D. P. RAM controller 402 outputs the DMA address and DREQ (DMA REQuest) signal to the arbiter 108.

When the data is read out from the RAM 106, the arbiter 108 outputs the data together with the DACK (Data ACKnowledge) signal to the data decompressor 107. The D. P. RAM controller 402 which receives the DACK signal sets the DREQ signal to be false, writes the data into the D. P. RAM 401, and counts up the write counter 403. The D. P. RAM controller 402 checks a difference between count values of the write counter 403 and read counter 404. When there is a vacant area in the memory, the controller 402 outputs the DREQ signal and writes the data into the D. P. RAM 401.

The data decompressor 205 reads out the compressed data from the D. P. RAM 401, decompresses the data, writes the decompressed data into the D flip-flop 206, and counts up the read counter 404. In a manner similar to the first embodiment, the decompressing operation is repeated until the end of the print data of one page. In this embodiment, as well, the cycle time for writing data into the D. P. RAM 401 is set to be equal to or faster than the cycle time for reading out data. The RAM 401 is constructed in a manner such that its capacity is equal to or larger than the value of [(the amount of data to be transferred to the engine I/F 109 per time)×(the increase rate of data)].

[Embodiment 3]

Embodiments 1 and 2 particularly relate to the print control apparatus for printing and outputting bit map image data while executing the decompressing process on bit map image data which was byte run length compressed. The embodiment 3, however, relates to the whole control process of the print control apparatus in which in accordance with a kind of data included in print data, the data can be directly outputted to the recorder without being stored into a frame buffer, or the data can be stored in the frame buffer and then outputted.

The operation of the print control apparatus of embodiment 3 will now be explained. When the host computer 101 outputs print data formed in an application program, the print data outputted by the application is outputted to the print controller 102 via a printer driver as a software program in the host computer. The printer driver decides the size or amount (the number of lines) which is to be processed by dividing one page into a plurality of areas from the memory capacity of the recorder 110 and forms the print data in correspondence to the decided size. The printer driver 102 classifies the print data transferred from the application into character information, rule information, and image information other than the above types of information and executes processes suitable for them, respectively, as will be described hereinbelow.

As for the character information, character codes, and page information such as size, printing position, and the like are processed and bit map data of font is compressed, thereby forming font data. The compressed font data is outputted to the print controller 102 by collecting a plurality of fonts to be used. The print controller 102 stores the received data into a specific area of the RAM 106 and uses such area as a font cache. Therefore, when a character of the same font is instructed in the page information, the compression font data is extracted from the font cache, is decompressed and is stored into the frame buffer.

Rule information is processed as vector or image information and is outputted to the print controller 102. Other data is byte run length compressed as image data and is outputted to the print controller 102.

The print data is classified to the above-mentioned three information every band and the print information is formed. The host computer 101 outputs the print information to the print controller 102. The print controller 102 receives the information through the host I/F 105 and, in the received data, the compressed font data is transferred to the font cache area and the other data is transferred to a reception buffer area by the CPU 103.

When all of the print information of one band is received, the CPU 103 analyzes this data and discriminates whether the band has been formed by one image information or includes a plurality of image information or character information and rule information. When one band is formed by one image information, as shown in embodiments 1 and 2, with respect to this band, a frame buffer is not formed but video data is directly formed (decompressed) from the byte run length compressed data and is outputted to the recorder 110.

When one band is made up of a plurality of image information or character information and rule information, a band buffer (page buffer) is formed from the information of the band. When print data of a plurality of bands is received and the band buffer is formed and all of the band buffers as much as one page are formed, the CPU 103 designates compression image data of the first band constructing one page, sets an output destination of the decompressed data into the RAM 106, and starts the data decompressor 107.

If there are a plurality of compression images, all of them are decompressed by the data decompressor 107 and stored into a first frame buffer area in the RAM 106. The rule information and character information are processed and stored into the first frame buffer area. Similarly, the second band is stored into a second frame buffer area. When all of the data in the second frame buffer is stored, the CPU 103 sets the output of the first frame buffer into the engine I/F 109, starts the recorder 110, and prints the print data in the first frame buffer.

After completion of the output of the print data of the first frame buffer, an output of the second frame buffer is soon set into the engine I/F 109 and the recorder 110 is resumed. The CPU 103 stores the data in a band buffer of the third band into the first frame buffer.

The compression data divided into a plurality of bands is processed while repeating the above operations and switching two frame areas, and in this way, one page is printed and outputted.

The foregoing embodiment 3 will now be described in detail with reference to flowcharts shown in FIGS. 5 to 9A and 9B. Programs regarding the flowcharts in FIGS. 5 to 9A and 9B are stored in the ROM 104 and controlled by the CPU 103.

Figure 5:
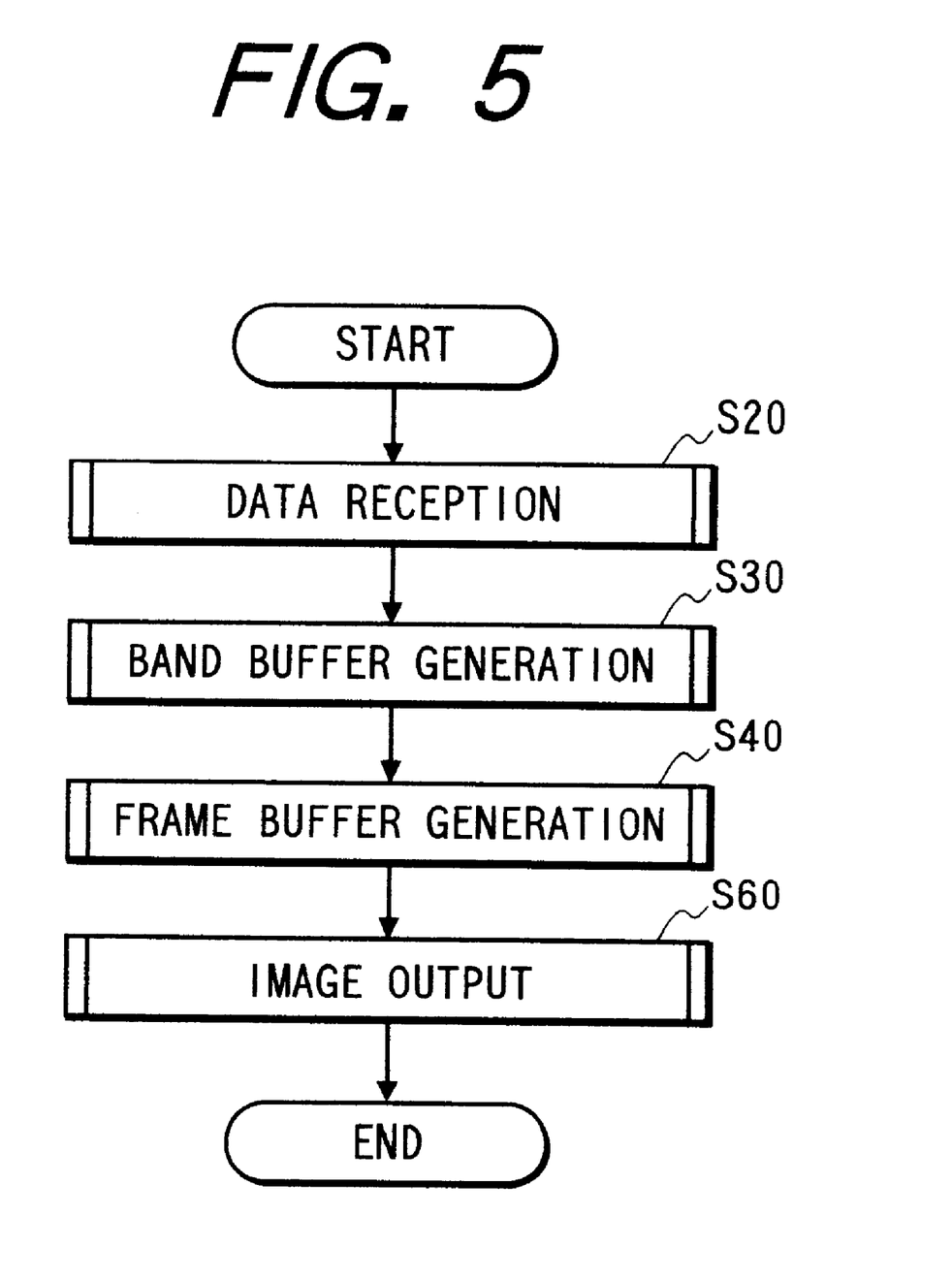
FIG. 5 is a flowchart showing the whole operation of a print controller in embodiment 3 of the invention.

FIG. 5 is a diagram showing a flow of the whole operation. As shown in FIG. 5, the print controller 102 first receives the data (step S20), generates a band buffer (step S30), generates a frame buffer (step S40), and finally outputs an image (step S60). The data reception, formation of the band buffer, formation of the frame buffer, and image output will now be described hereinbelow with reference to FIGS. 6, 7, 8 and FIGS. 9A and 9B, respectively. What is termed a "band" in this embodiment may be either an area of one page or an area obtained by dividing one page.

Figure 6:
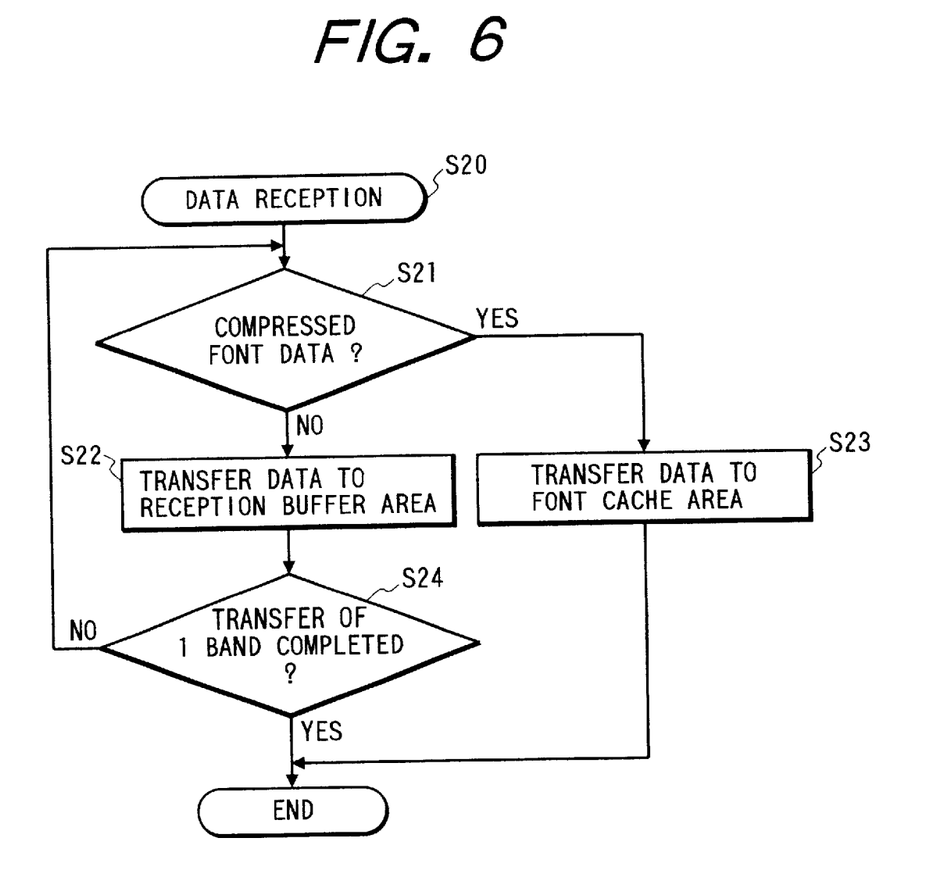
FIG. 6 is a flowchart showing the operation to receive data in the operations of the print controller in embodiment 3 of the invention.

As shown in FIG. 6, in the data reception, a check is made to see if the data is compressed font data (step S21). If NO, the data is transferred to the reception buffer area (step S22). A check is then made to see if the data transfer of one band has been finished (step S24). If NO, the processing routine is returned to step S21. If the data is the compressed font data in step S21, the data is transferred to a font cache area (step S23).

Figure 7:
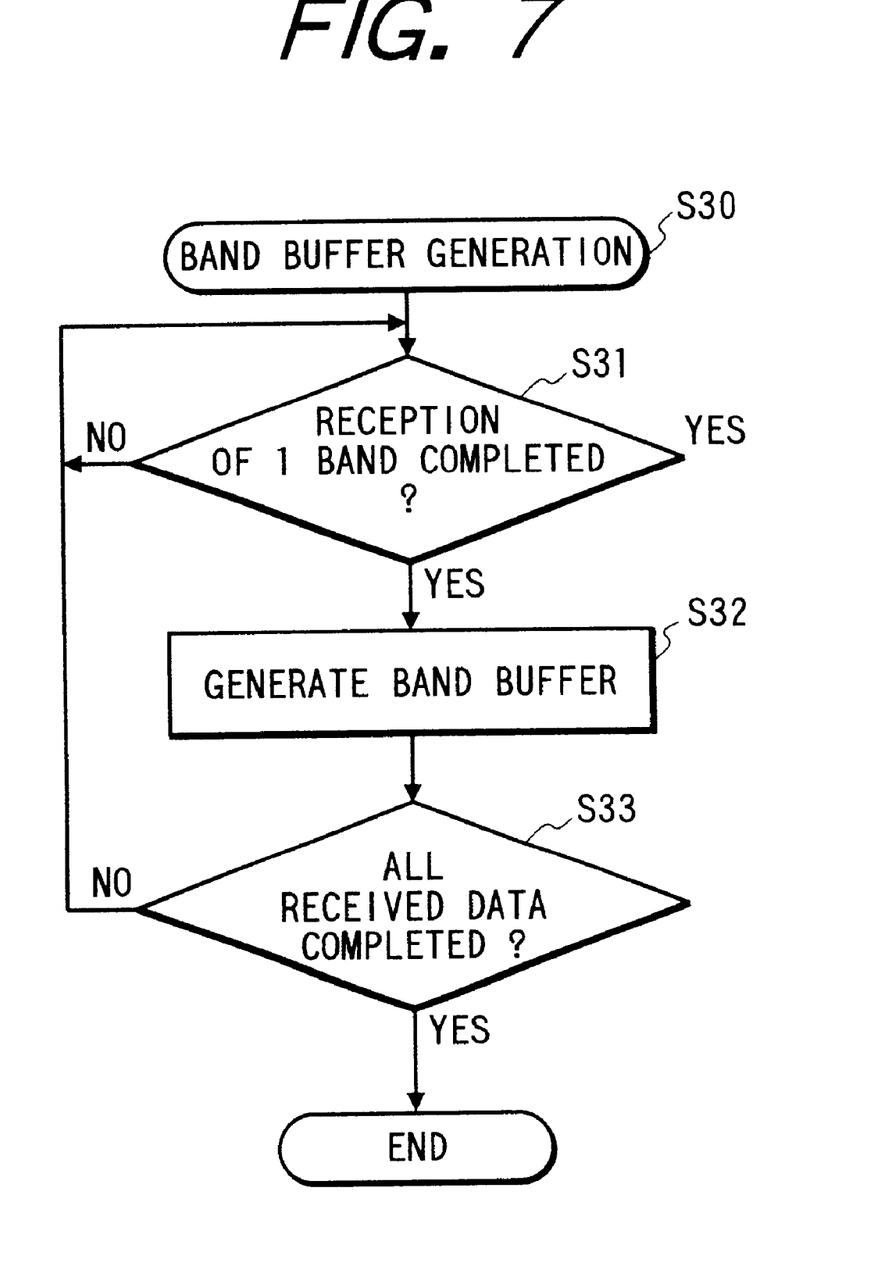
FIG. 7 is a flowchart showing the operation to form a band buffer in the operations of the print controller in embodiment 3 of the invention.

As shown in FIG. 7, in the formation of the band buffer, the apparatus waits for the end of the reception of one band (step S31) and forms a band buffer (step S32). After that, a check is made to see if all of the reception data has been processed (step S33). If NO, the processing routine is returned to step S31 and advances to steps S32 and S33 after that. Those steps are repeated, all of the reception data is processed, and the operation to form the band buffer is finished.

Figure 8:
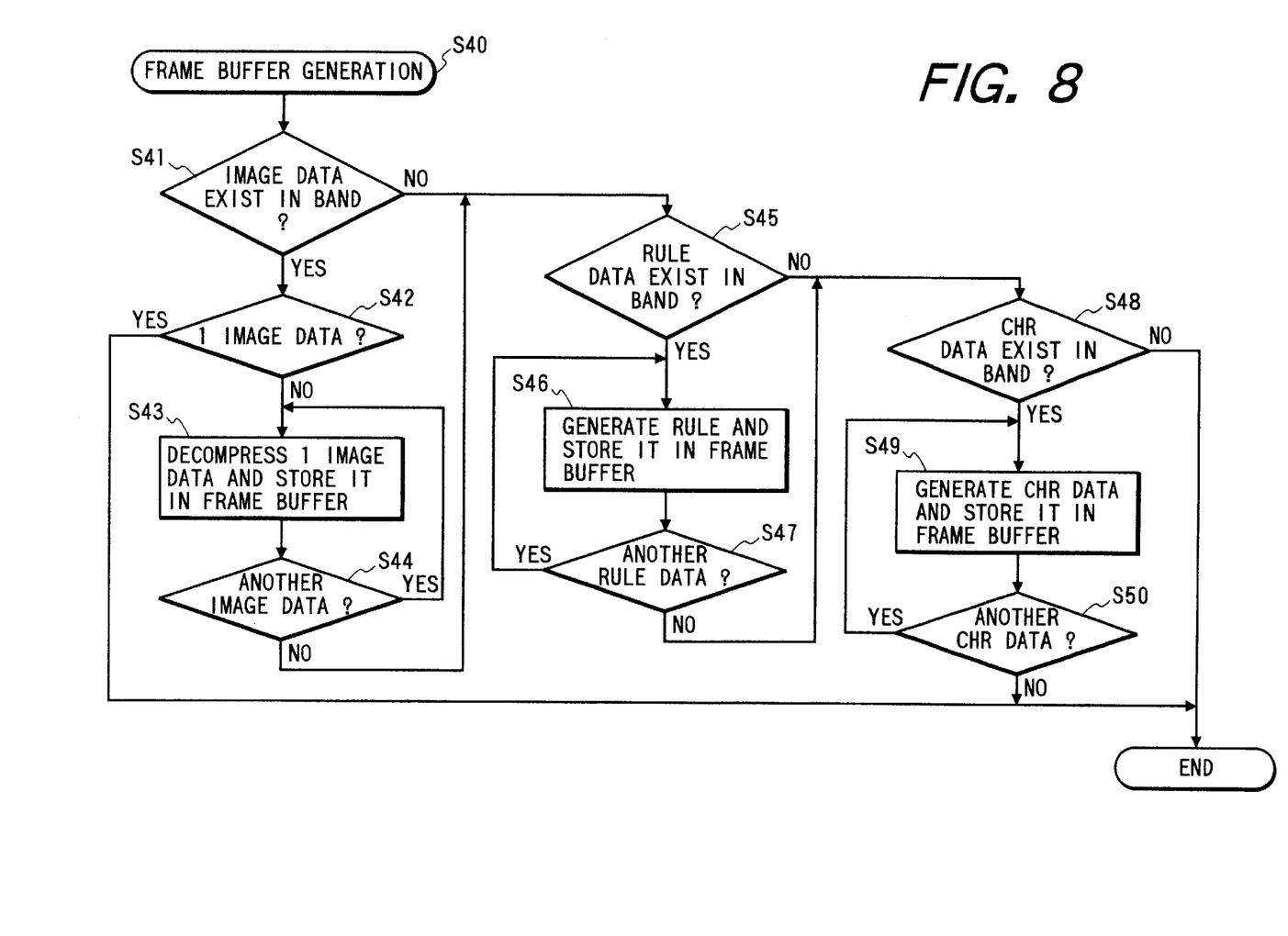
FIG. 8 is a flowchart showing the operation to form a frame buffer in the operations of the print controller in embodiment 3 of the invention.

As shown in FIG. 8, in the formation of the frame buffer, a check is made to see if image data exists in the band (step S41). If YES, a check is made to see if it is formed by one image data (step S42). If YES, the operation of the formation of the frame buffer is finished at this time point. If NO, one image data is decompressed and stored into the frame buffer (step S43). After that, a check is made to see if there is other image data. If YES, the processing routine is returned to step S43 and advances to step S44. The apparatus waits until there is no other image data which is not decompressed.

When it is decided in step S41 that no image data exists in the band and when it is determined in step S44 that all of the image data has been decompressed, a check is made to see if rule data exists in the band (step S45). If YES, a ruled line is generated and stored in the frame buffer (step S46). After that, a check is made to see if there is any other rule data (step S47). If YES, the processing routine is returned to step S46 and advances to step S47 and the apparatus waits until there is no other rule data which is not stored in the frame buffer.

When it is decided in step S45 that there is no rule data in the band and when it is determined in step S47 that all of the rule data has been stored in the frame buffer, a check is made to see if there is character data in the band (step S48). When there is character data, the character data is generated and stored into the frame buffer (step S49). After that, a check is made to see if there is any other character data (step S50). If YES, the processing routine is returned to step S49 and advances to step S50. The apparatus waits until there is no other character data which is not stored in the frame buffer. When it is decided in step S48 that there is no character data in the band and when it is determined in step S50 that all of the character data has been stored in the frame buffer, the operation to form the frame buffer is finished.

Figures 9, 9A:
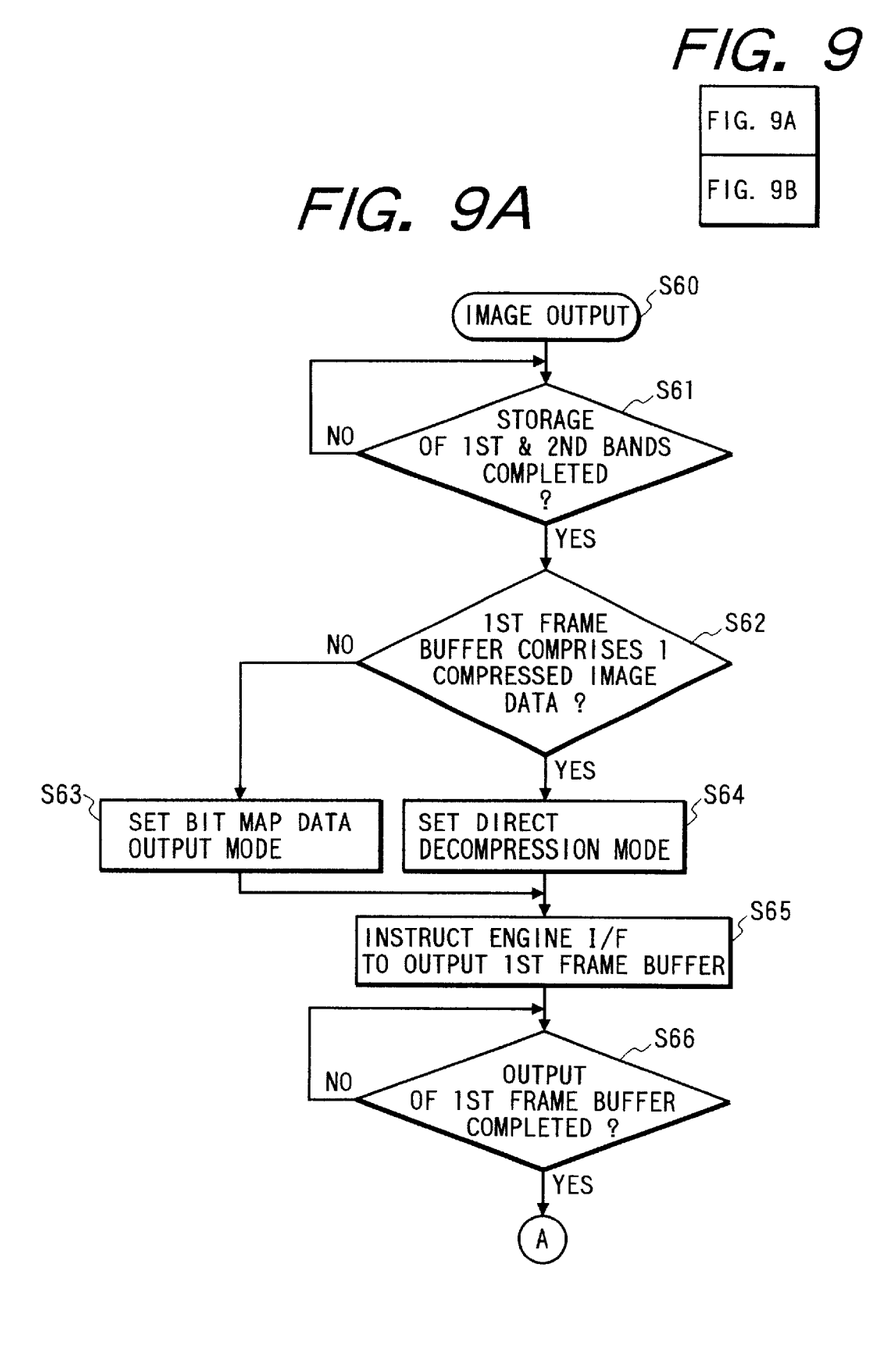
Figure 9B:
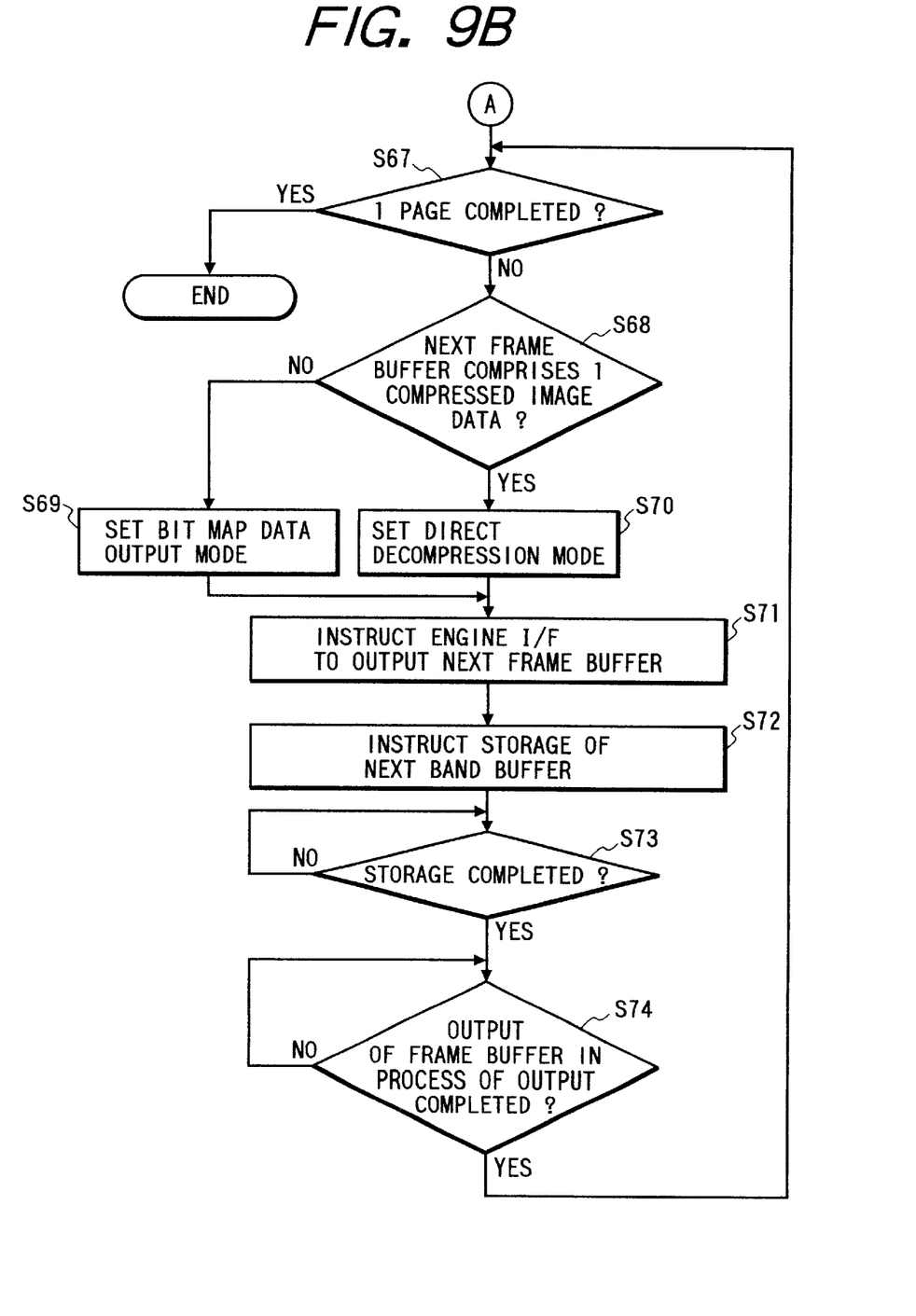

As shown in FIGS. 9A and 9B, in the image output, after waiting for the end of the storage of the first and second bands (step S61), a check is made to see if the first frame buffer has been formed by one compression image data (step S62). If NO, the apparatus is set into a mode to output the bit map data stored in the frame buffer (step S63). If YES, the apparatus is set to a mode for directly decompressing the compression image data and outputting (step S64). After that, the apparatus instructs the engine I/F to generate the first frame buffer (step S65). The apparatus waits for the end of the output of the data from the first frame buffer (step S66).

When the mode to directly decompress and output the data is set in step S64, on the basis of the output instruction in step S65, the engine I/F requests the decompressor to generate the data and the decompressor decompresses the compressed data and directly outputs it to the engine I/F. When the mode to output the bit map data is set in step S63, the engine I/F requests the decompressor to generate the data and the decompressor requests the arbiter to output the bit map data stored in the RAM to the engine I/F.

After completion of the output of the first frame buffer, a check is made to see if the output of the data of one page has been finished (step S67). When it is not finished, a check is made to see if the data in the next frame buffer has been formed by one compression image data (step S68). If NO, the apparatus is set to the mode to generate the bit map data (step S69). If YES, the apparatus is set to the mode for directly decompressing the compression image data and outputting (step S70).

After that, the apparatus instructs the engine I/F to output the data of the next frame buffer (step S71) and instructs the storage of the data of the next band buffer (step S72). After that, the apparatus waits for the end of the storage (step S73) and waits for the end of the output of the data of frame buffer which is being outputted (step S74). The processing routine is returned to step S67. After that, steps S68 to S74 are repeated until the output of the data of one page is finished. After completion of the data output of one page, the operation of the image output is finished. Although the discrimination in each of steps S62 and S68 has been performed every band in the embodiment, it can be also executed on a page unit basis for simplicity of processes.

According to the invention as described above, the bit map data can be printed and outputted while executing the decompressing process without storing the bit map image data which was byte run length compressed into the memory.

According to the invention, a print control apparatus which can directly output the data to the recorder without storing into the frame buffer or can store the data into the frame buffer and output in accordance with the kind of data included in the print data is obtained.

What is claimed is:

1. A print control apparatus comprising:
   a first memory unit, arranged for storing compressed image data;
   a conversion circuit, arranged for converting the compressed image data stored in said first memory unit to a converted image data;
   a second memory unit arranged for storing the converted image data converted by said conversion circuit,
   wherein said first memory unit has a capacity determined based on a capacity of said second memory unit and an increase rate in compression associated with the compressed image data; and
   a control unit arranged to, if a certain band of data comprises one piece of compressed image data, (i) transmit the one piece of compressed image data to said first memory unit without forming a frame buffer for the band so as to store the one piece of compressed image data in said first memory unit, (ii) control said conversion circuit to convert the one piece of compressed image data stored in said first memory unit to a converted image data, (iii) control said second memory unit to store the converted image data converted by said conversion circuit, and (iv) transmit the converted image data stored in said second memory unit directly to a printer engine.

2. An apparatus according to claim 1, wherein the compressed image data are compressed in a compression method in which a data amount after compression may increase.

3. An apparatus according to claim 1, wherein the band of data includes one page of data.

4. An apparatus according to claim 1, further comprising a second control unit, arranged to, if a certain band of data comprises a plurality of pieces of compressed image data, decompress the plurality of pieces of compressed image data and store the decompressed image data in a frame buffer.

5. A print control apparatus comprising:
   a first memory unit, arranged for storing compressed image data;
   a conversion circuit, arranged for converting the compressed image data stored in said first memory unit to a converted image data;
   a second memory unit arranged for storing the converted image data converted by said conversion circuit; and
   an output unit, arranged for outputting the image stored in said second memory unit to a printer engine,
   wherein said first memory unit has a capacity determined based on a capacity of said second memory unit and an increase rate in compression associated with the compressed image data.

6. A printer comprising:
   a printer engine;
   a first memory unit, arranged for storing compressed image data;
   a conversion circuit, arranged for converting the compressed image data stored in said first memory unit to a converted image data;
   a second memory unit arranged for storing the converted image data converted by said conversion circuit,
   wherein said first memory unit has a capacity determined based on a capacity of said second memory unit and an increase rate in compression associated with the compression image data; and
   a control unit arranged to, if a certain band of data comprises one piece of compressed image data, (i) transmit the one piece of compressed image data to said first memory unit without forming a frame buffer for the band so as to store the one piece of compressed image data in said first memory unit, (ii) control said conversion circuit to convert the one piece of compressed image data stored in said first memory unit to a converted image data, (iii) control said second memory unit to store the converted image data converted by said conversion circuit, and (iv) transmit the converted image data stored in said second memory unit directly to said printer engine.

7. A print control method comprising:
   a storing step of storing compressed image data in a first memory;
   a converting step of converting the compressed image data stored in said first memory to a converted image data;
   a storing step of storing the converted image data converted by said converting step in a second memory,
   wherein said first memory has a capacity determined based on a capacity of said second memory and an increase rate in compression associated with the compressed image data; and
   a control step of, if a certain band of data comprises one piece of compressed image data, (i) transmitting the one piece of compressed image data to said first memory unit without forming a frame buffer for the band so as to store the one piece of compressed image data in said first memory unit, (ii) converting the one piece of compressed image data stored in said first memory unit to a converted image data, (iii) storing the converted image data in said second memory, and (iv) transmitting the converted image data stored in said second memory unit directly to a printer engine.

8. A method according to claim 7, wherein the compressed image data are compressed in a compression method in which a data amount after compression may increase.

9. A method according to claim 7, wherein the band of data includes one page of data.

10. A method according to claim 7, further comprising a second control step of, if a certain band of data comprises a plurality of pieces of compressed image data, decompressing the plurality of pieces of compressed image data and storing the decompressed image data in a frame buffer.

11. A print control method comprising:

a storing step of storing compressed image data in a first memory;

a converting step of converting the compressed image data stored in said first memory to a converted image data;

a storing step of storing the converted image data converted by said converting step in a second memory; and an output step of outputting the image stored in said second memory to a printer engine, wherein said first memory unit has a capacity determined based on a capacity of said second memory and an increase rate in compression associated with the compressed image data.

12. A printer comprising:

a first memory unit, arranged for storing compressed image data;

a conversion circuit, arranged for converting the compressed image data stored in said first memory unit to a converted image data;

a second memory unit arranged for storing the converted image data converted by said conversion circuit; and an output unit, arranged for outputting the image stored in said second memory unit to a printer engine of the printer, wherein said first memory unit has a capacity determined based on a capacity of said second memory unit and an increase rate in compression associated with the compressed image data.

* * * * *